US011032398B1

(12) United States Patent
Herbert et al.

(10) Patent No.: US 11,032,398 B1
(45) Date of Patent: *Jun. 8, 2021

(54) KERNEL MULTIPLEXING SYSTEM OF COMMUNICATIONS

(71) Applicant: Facebook, Inc., Menlo Park, CA (US)

(72) Inventors: Tom Herbert, Los Gatos, CA (US); Blake Ross Matheny, Woodside, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,504

(22) Filed: Nov. 22, 2019

Related U.S. Application Data

(63) Continuation of application No. 15/206,683, filed on Jul. 11, 2016, now Pat. No. 10,523,793.

(51) Int. Cl.
*H04L 29/06* (2006.01)
*H04L 29/08* (2006.01)

(52) U.S. Cl.
CPC ........ *H04L 69/162* (2013.01); *H04L 65/1069* (2013.01); *H04L 67/025* (2013.01)

(58) Field of Classification Search
CPC ... H04L 63/1408; H04L 51/32; H04L 63/104; H04L 43/08; H04L 63/0245; G06Q 50/01; H04W 4/50
See application file for complete search history.

(56) References Cited

U.S. PATENT DOCUMENTS

| 7,613,813 | B2 * | 11/2009 | Hussain | H04L 49/90 |
| | | | | 370/386 |
| 8,121,117 | B1 * | 2/2012 | Amdahl | H04L 69/161 |
| | | | | 370/389 |
| 8,601,114 | B1 | 12/2013 | Cooper | |
| 2007/0130367 | A1 * | 6/2007 | Kashyap | H04L 49/90 |
| | | | | 709/245 |
| 2007/0239890 | A1 * | 10/2007 | Chen | G06F 9/505 |
| | | | | 709/238 |

(Continued)

OTHER PUBLICATIONS

Non-Final Office Action received for U.S. Appl. No. 15/206,683 dated Jul. 5, 2018, 43 pages.

(Continued)

*Primary Examiner* — Hitesh Patel
(74) *Attorney, Agent, or Firm* — FisherBroyles, LLP

(57) ABSTRACT

A system for providing a message-based protocol for multiplexing messages sent via a stream-based connection protocol is provided. A multiplexing system provides high-level sockets of the message-based protocol that interact with low-level sockets of a stream-based connection protocol. The multiplexing system executes in a privilege mode. To send a message, an application uses a high-level socket to provide a request to send the message using the multiplexing system. The multiplexing system selects an available low-level socket from a group of sockets and sends the message via that socket. The message is sent as an atomic operation. If, during the sending of the message, the application requests to send another message, the multiplexing system selects another available low-level socket of the group and sends the other message via the selected low-level socket.

17 Claims, 9 Drawing Sheets

(56) References Cited

U.S. PATENT DOCUMENTS

| | | | |
|---|---|---|---|
| 2009/0157896 A1* | 6/2009 | Kim | H04L 69/16 709/232 |
| 2012/0106915 A1 | 5/2012 | Palmer | |
| 2017/0099303 A1 | 4/2017 | Cooper et al. | |
| 2018/0013866 A1 | 1/2018 | Herbert et al. | |

OTHER PUBLICATIONS

Final Office Action received for U.S. Appl. No. 15/206,683 dated Nov. 30, 2018, 50 pages.
Non-Final Office Action received for U.S. Appl. No. 15/206,683 dated Apr. 2, 2019, 50 pages.
Notice of Allowance received for U.S. Appl. No. 15/206,683 dated Aug. 30, 2019, 36 pages.

* cited by examiner

US 11,032,398 B1

KERNEL MULTIPLEXING SYSTEM OF COMMUNICATIONS

This application is a continuation of U.S. patent application Ser. No. 15/206,683, filed on 11 Jul. 2016. The disclosure of which is incorporated herein, in its entirety, by this reference.

BACKGROUND

The Transmission Control Protocol ("TCP") provides communication services for transmitting a data stream from a program executing on one device (e.g., server, desktop computer, smartphone) to a program executing on another device. TCP is a transport layer protocol of the Open Systems Interconnection model and typically interfaces with the Internet Protocol ("IP") of the network layer. The combination of TCP at the transport layer and IP at the network layer is referred to as TCP/IP.

IP provides services for transmitting packets from a device with a source IP address to a device with a destination IP address without establishing a connection and not maintaining state. As a result, IP does not guarantee delivery of the packets. TCP, however, does establish a connection between the source and destination devices and guarantees delivery of the data stream sent as IP packets. TCP uses an acknowledgment protocol to detect when packets are delivered. At the source device, TCP retransmits packets whose delivery is not acknowledged by the destination device. At the destination device, TCP assembles the packets into the data stream and presents the data stream to the destination program identified by a port.

Application programs use higher level protocols, such as the Remote Procedure Call protocol ("RPC") and the Hyper-Text Transport Protocol ("HTTP"), to send messages using TCP. Since TCP is stream-oriented, it does not understand the semantics of the messages. As a result, application programs need to track message boundaries and compile the data sent as a stream into the messages.

An application program often loops, repeating the process of preparing and sending a message or receiving and processing a message. If an application program is multi-threaded, then multiple threads may need to receive or send messages using the same TCP connection or socket. Because TCP does not understand the semantics of the messages, if the content of messages from different threads is interleaved on the TCP connection, TCP at the destination device will not know which content belongs to which message. As a result, application programs need to ensure that the sending of each message is sent atomically, that is, completes before the next message is sent.

To send messages atomically, the threads of the application program need to coordinate their access to a shared TCP socket. Application programs may coordinate their access using various synchronization techniques such as locking and unlocking of the TCP socket. Such synchronization techniques may place a heavy performance burden on the application programs as waiting threads may need to loop to attempt to lock the TCP socket.

DETAILED DESCRIPTION

Figure 1:
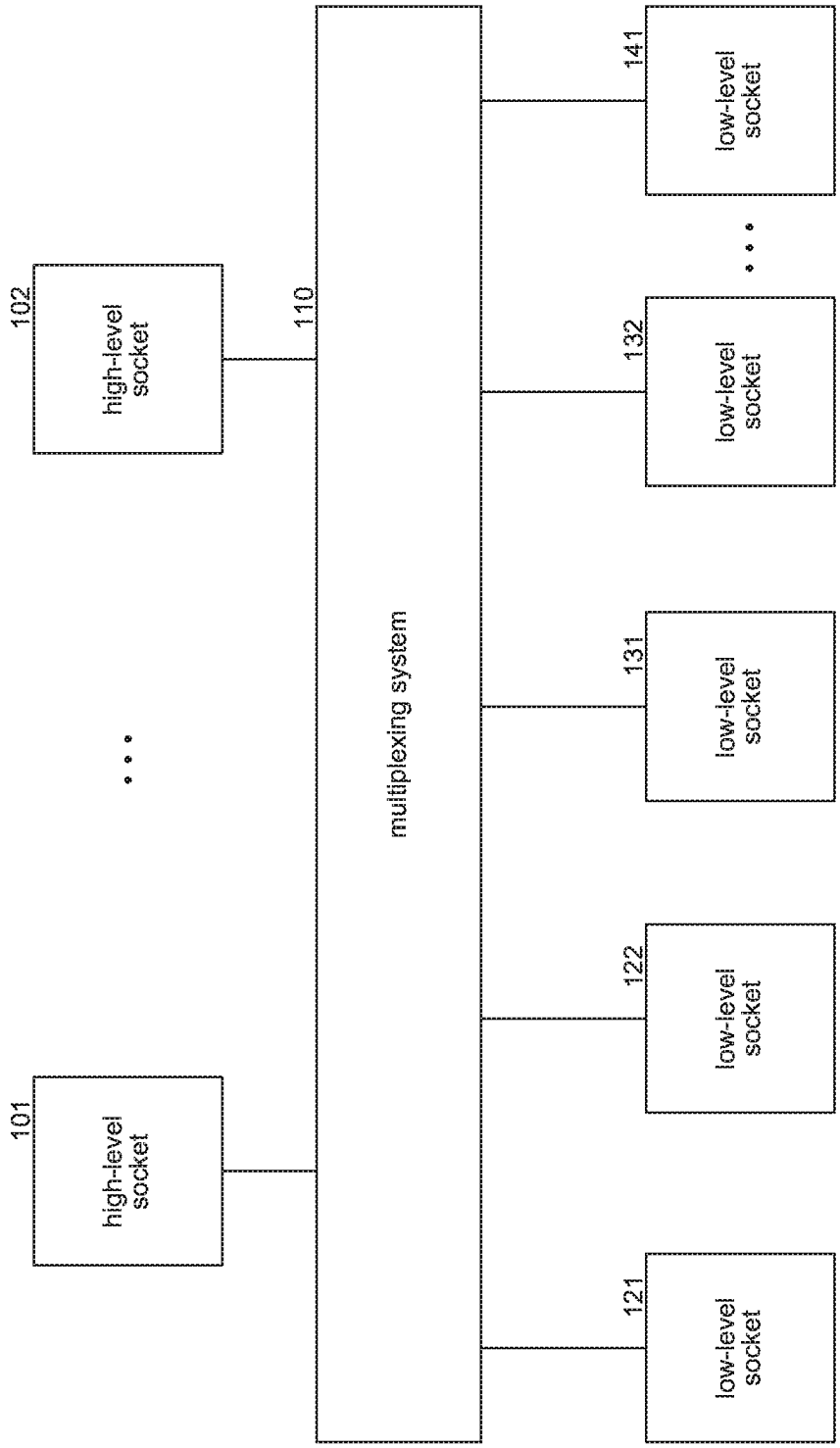
FIG. 1 is a block diagram that illustrates the architecture of the multiplexing system in a connected mode in some embodiments.

A method and system for providing a message-based protocol for multiplexing messages sent via a stream-based connection protocol is provided. In some embodiments, a multiplexing system provides high-level sockets of the message-based protocol that interact with low-level sockets of a stream-based connection protocol (e.g., TCP). The multiplexing system executes in a privilege mode (e.g., kernel mode), and applications that use the message-based protocol execute in a non-privilege mode (e.g., user mode). To send a message, an application uses a high-level socket to provide a request to send the message using the multiplexing system. The multiplexing system selects an available low-level socket from a group of sockets and sends the message via the socket. The message is sent as an atomic operation in the sense that no other message will be sent via the selected low-level socket until the sending of the message has been completed. The application can continue to execute while the message is being sent. If, during the sending of the message, the application then requests to send another message, the multiplexing system will select another available low-level socket of the group and sends the other message via the selected low-level socket. When a message is sent, the multiplexing system may associate a message identifier that is part of the message with the high-level socket. When a response message is received via any of the low-level sockets, the multiplexing system uses the message identifier that is included in the response message to identify and pass the response message to the associated high-level socket. The multiplexing system allows an application to provide a parser for use in determining the message identifier as well as the length of the message that is received so that the multiplexing system can determine the length of the message without having to know its structure. Thus, the multiplexing system effectively multiplexes the messages to be sent and received via low-level sockets, processes the messages in parallel, and can be used with messages of different internal structures, and does not need to understand the semantics of the messages.

In some embodiments, when requested by an application, an operating system executing on a computing device creates a plurality of low-level sockets and high-level sockets.

For example, the application may use an existing socket operating system call to create TCP sockets. For each low-level socket, the application establishes a connection with a remote device or places the low-level socket in a listen mode. To send a message, an application sends to the multiplexing system via a high-level socket a request to send a message to the remote device. The multiplexing system determines whether a low-level socket is available. When a low-level socket is available, the multiplexing system selects a low-level socket and sends the message via the connection established for that low-level socket. When a low-level socket is not available, the multiplexing system queues the message for later sending when a low-level socket is available.

In some embodiments, the multiplexing system may create groups of low-level sockets for communicating with different remote devices. For example, one group may have five low-level sockets for communicating with one remote device and another group may have three low-level sockets for communicating with another remote device. In some embodiments, the same destination or group can have multiple low-level sockets for the purposes of load balancing, reliability, failover, etc. Multiple connection groups allow a smaller number of high-level sockets than it may be needed without the connection groups to send to and/or receive from multiple destinations. The multiplexing system provides an attach function for an application to attach a low-level socket to the desired group and provide a name for the group. When the multiplexing system receives a request to send a message via a high-level socket, the request includes the name of the group of low-level sockets to which the message is to be directed. In some embodiments, the application might not use groups of low-level sockets. In such an embodiment, each individual low-level socket is provided a name via the attach function. The request to send a message includes the name of the low-level socket to which the message is to be directed. In yet another embodiment, the request to send a message may not have the name of the low-level socket; the multiplexing system may choose one of the low-level sockets to send the message through, e.g., based on an availability of the low-level sockets.

The multiplexing system can be configured to work in connected mode or in unconnected mode. In a connected mode, all the high-level socket and the low-level socket form part of only group or destination and all the sockets send and/or receive data packets from and/or send data packets to the same destination. In an unconnected mode, the multiplexing system can have multiple groups or destinations, and different low-level socket belong to different groups. That is, one group or destination can have more than one low-level socket and data packets are sent to and/or received from that destination using any of those more than one low-level sockets.

FIG. 1 is a block diagram that illustrates the architecture of the multiplexing system in a connected mode in some embodiments. The multiplexing system 110 provides high-level sockets 101 and 102 to an application for accessing low-level sockets 121, 122, 131, 132 and 141. The multiplexing system 110 is in a connected mode, that is, all the high-level sockets form part of one group or destination and receive data from and/or send data to a single destination. The multiplexing system 110 sends data as messages, e.g., which are of a protocol specified by the application, to the multiplexing system 110, which further transmits the messages using a stream based protocol, e.g., TCP. Similarly, the multiplexing system receives data in a stream based protocol, processes the stream to extract messages out of the stream and send the extracted messages to the application. When an application invokes a function of a high-level socket, control is passed to the multiplexing system to perform the processing of the multiplexing system in privilege mode. For example, when an application invokes a function to send a message, the multiplexing system identifies an available low-level socket and sends a message via the low-level socket.

To send or receive data, the application may have to find an available high-level socket and a low-level socket and bind them. The application can then use the multiplexing system 110 to send or receive data through the bound socket pair. The application can generate the multiplexing system 110 by opening up a high-level socket. Typically, when the application opens the first high-level socket, the first high-level socket can implicitly create the multiplexing system 110. After the first high-level socket is created, the application can create additional high-level sockets, e.g., by cloning the high-level socket with a function call such as "accept" or "ioctl" call. The multiplexing system 110 can then find an available low-level socket and bind the high-level socket to the available low-level socket by performing ioctl (input-output control) on the high-level socket, e.g., which can initiated using an "ioctl" function call. After the sockets are bound, they can be used to send or receive the data.

For sending a message to a destination, the application sends the message to one of the available high-level sockets, e.g., high-level socket 101. The multiplexing system 110 queues the message at the high-level socket 101 until the complete message is received at the high-level socket 101. The multiplexing system 110 determines if a low-level socket is available and binds the high-level socket 101 to an available low-level socket, e.g., the low-level socket 141. After the multiplexing system 110 binds the high-level socket 101 and the low-level socket 141, the high-level socket 101 starts transmitting the message to the low-level socket 141. The low-level socket 141 can then start transmitting the message to the intended destination. In an event a buffer associated with the low-level socket 141 is full before the high-level socket 101 can completely transmit the message, the high-level socket 101 can wait until the buffer is available again to transmit the remaining portion of the message to the high-level socket 101.

After all the messages that need to be sent to the destination are written to the low-level socket 141, the multiplexing system 110 unbinds the high-level socket 101 from the low-level socket 141. After the sockets are unbound from each other, the application can use the sockets for sending other messages. In some embodiments, the application can be a multi-threaded application and different threads can use different sockets to transmit and/or receive messages. While a pair of sockets, e.g., a high-level socket and a low-level socket, are bound to each other and are being used by a thread of the application, no other thread of the application can use the sockets while they are bound to each other. The sockets can be used by other threads after the multiplexing system 110 unbinds the sockets. While a thread is using one pair of sockets for sending a message, other threads can use other pairs for sending their corresponding messages. The multiplexing system 110 enables sending of multiple messages simultaneously or in parallel.

For receiving a message, the multiplexing system 110 can process the stream of data packets received at a low-level socket, e.g., the low-level socket 141, delineate the messages from the stream of data packets and send the data as one or more messages to the application. In some embodiments, the data is received as packets at the low-level socket 141. A data packet can have one or more messages or a portion of a message. When a data packet is received at the low-level socket 141, the low-level socket 141 uses a parser provided by the application to determine a length of a message from the data packet. After the length of the message is determined, the low-level socket 141 reads the data for that length from the data packet. If the entire message is within the same data packet, the low-level socket 141 extracts the entire message. For example, if the data packet is a 1400 byte size data packet and the length of the message is 1200, the low-level socket 141 reads 1200 bytes from the data packet. After reading the entire message, the low-level socket 141 determines if a high-level socket is available. If an high-level socket, e.g., the high-level socket 101, is available, the multiplexing system 110 queues the entire message at the high-level socket 101, e.g., a buffer associated with the high-level socket 101, and wakes up the high-level socket 101 and/or application. The high-level socket 101 can then read the message from the buffer and send the message to the application.

In an event the entire message is not available in the data packet, the low-level socket 141 waits until the next data packet is received at the low-level socket 141. After the low-level socket 141 receives the next data packet, it processes the data packet, e.g., as described above, and extracts the remainder of the message from the data packet and then sends the entire message to the high-level socket 101. For example, after reading the first message of 1200 bytes from the first data packet of 1400 bytes, the parser analyzes the remaining 200 bytes of the data packet to determine the length of the next message. The parser can determine that the length of the next message is 1000 bytes. Accordingly, the low-level socket 141 waits until the next data packet is received. After receiving the next data packet, the low-level socket 141 will extract the remainder of the message, e.g., 800 bytes from the next data packet, and then send the 1000 byte message to the high-level socket 101.

In some embodiments, the low-level socket 141 will not queue the message, e.g., send the message, at the high-level socket 101 until the entire message is available at the low-level socket 141. Further, if the high-level socket 101 buffer does not have sufficient storage space for the entire message, the low-level socket 141 may not send the message to the high-level socket 101. The low-level socket 141 can wait until the storage space is available for the entire message. Also, while the low-level socket 141 is waiting for the buffer of the high-level socket 101 to clear up for sending the entire message, if any additional data packets are received at the low-level socket 141 for the application, the multiplexing system 110 may not read the new data packets arriving at the low-level socket 141. However, in some embodiments, the low-level socket 141 may read the new data packets arriving at the low-level socket 141 and store it until the buffer of the high-level socket 101 becomes available to store additional data. The multiplexing system 110 can perform flow-controlling all the way to the sender of the data. In other words, the multiplexing system 110 can instruct the sender to wait for a specified duration or until further instructions from the multiplexing system 110 for sending the new data packets. Once the high-level socket 101 becomes available to take the next message, the low-level socket 141 can send the message currently stored at the low-level socket 141 to the high-level socket 101, and then start accepting new data packets from the sender.

The parser analyzes the incoming data packets at the low-level socket 141 to determine the length of the message in the data packets. Data packets of different protocols, e.g., HTTP (hyper-text transfer protocol), RPC (remote procedure call), SPDY (speedy), can have different structures. For example, they can have different fields in a header structure; fields can be of different lengths in different protocols. Accordingly, the parser should be capable of interpreting data packets of different protocols. In some embodiments, the application generates the parser for a specified protocol and sends the parser to the multiplexing system 110. In some embodiments, the parser can be generated based on a Berkley Packet Filter (BPF).

Figure 2:
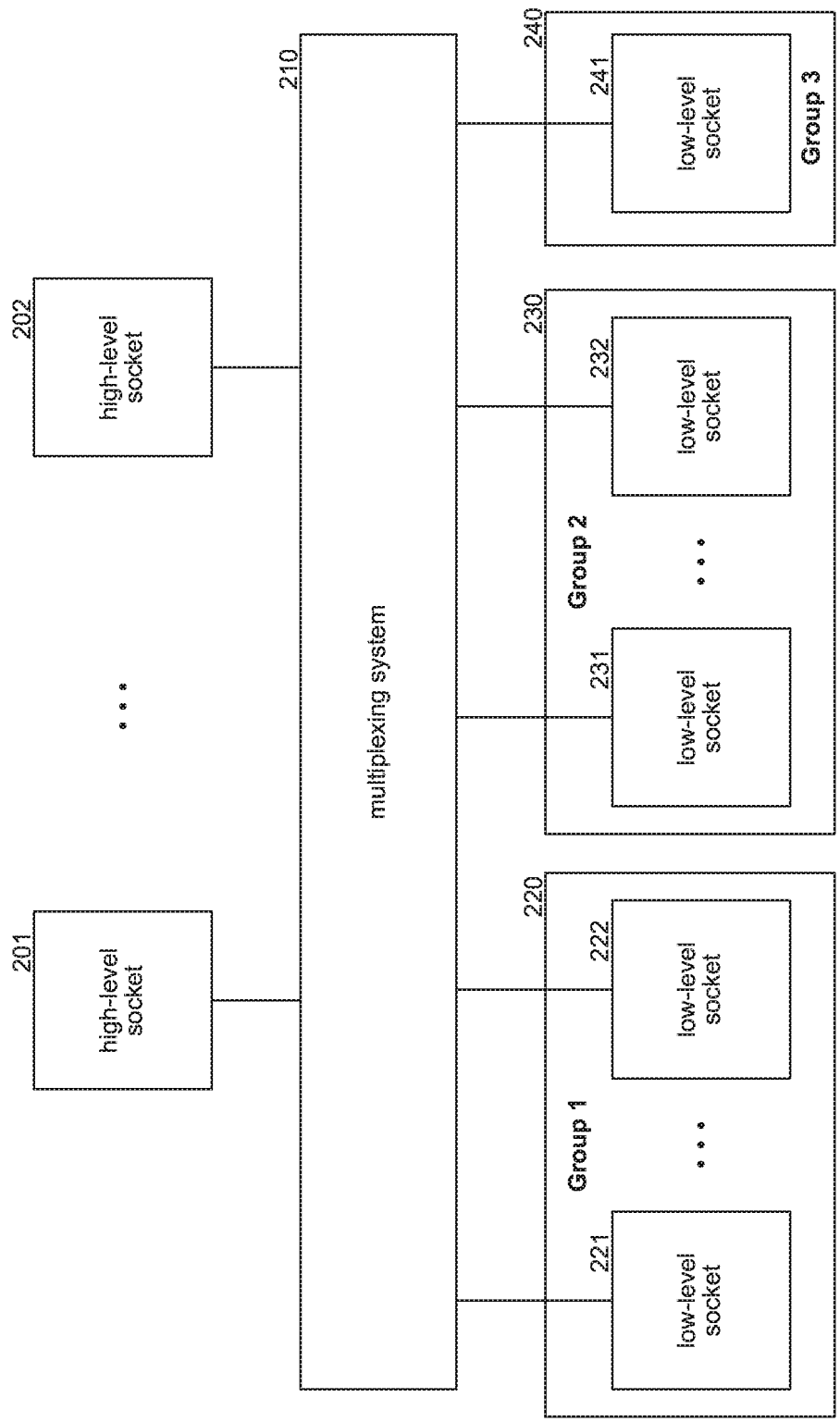
FIG. 2 is a block diagram that illustrates the architecture of the multiplexing system in an unconnected mode in some embodiments.

FIG. 2 is a block diagram that illustrates the architecture of the multiplexing system in an unconnected mode in some embodiments. In some embodiments, the multiplexing system 210 is similar to the multiplexing system 110 of FIG. 1 and the sockets 221-241 are similar to the sockets 121-141. Low-level sockets 221 and 222 are in a first group 220, low-level sockets 231 and 232 are in a second group 230, and low-level socket 241 is in a third group 240. That is, the low-level sockets 221 and 222 can send data to and/or receive data from a first destination, the low-level sockets 231 and 232 can send data to and/or receive data from a second destination and the low-level socket 241 can send data to and/or receive data from a third destination. When the data packets are received and/or transmitted, the multiplexing system 210 specifies the connection group or the destination to and/or from which the message is received and/or sent. In some embodiments, the same destination or group can have multiple low-level sockets for the purposes of load balancing, reliability, failover, etc. Multiple connection groups allow a smaller number of high-level sockets than it may be needed without the connection groups to send to and/or receive from multiple destinations.

Figure 3:
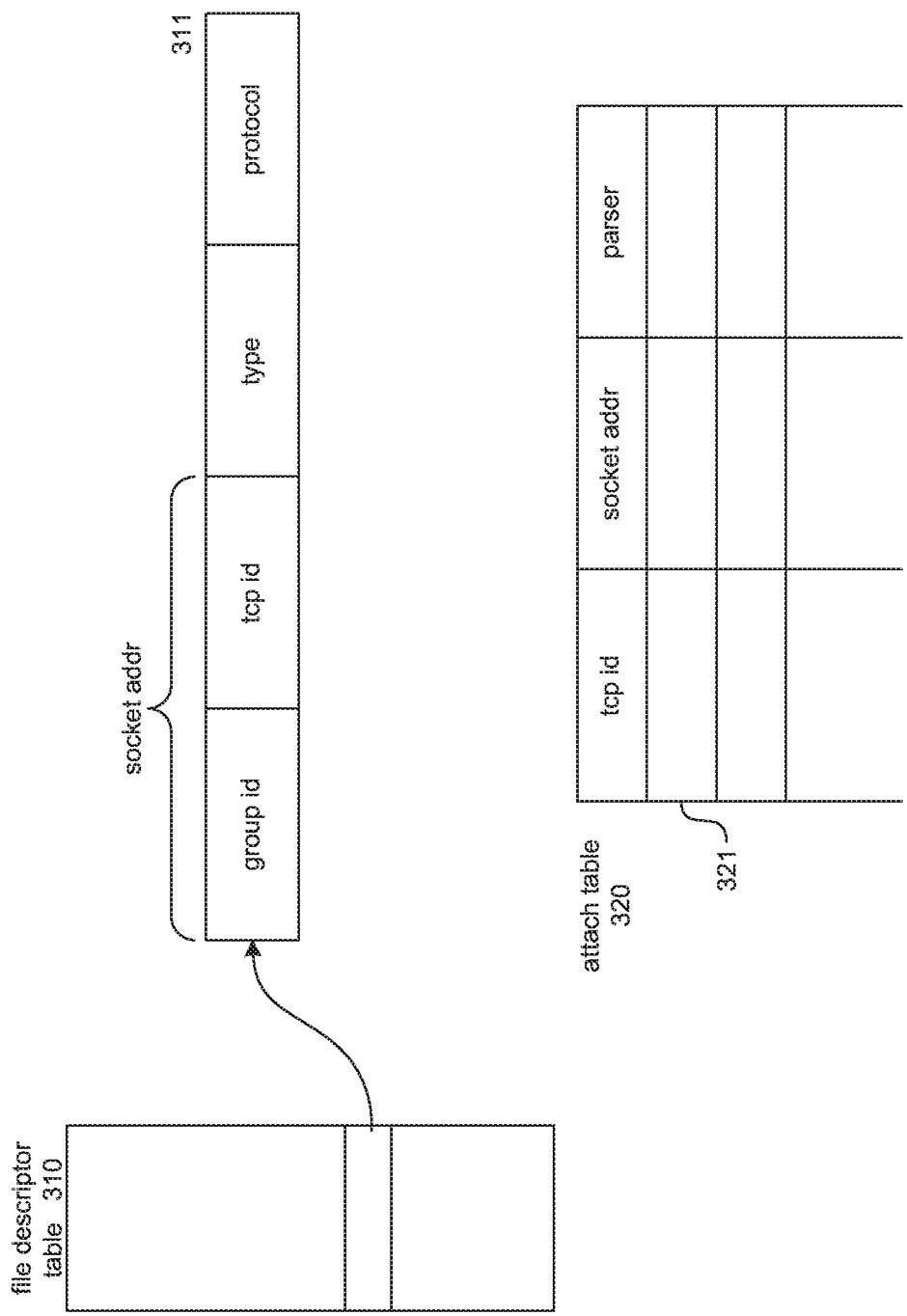
FIG. 3 illustrates data structures used by the multiplexing system in some embodiments.

FIG. 3 illustrates data structures used by the multiplexing system of FIG. 1 in some embodiments. When a high-level socket is created, an entry is added to the file descriptor table 310 of the operating system that points to the file descriptor 311 for the high-level socket. The file descriptor 311 includes the address or name for the socket such as a group identifier and a low-level socket identifier, as well as the type of the socket and the protocol of the socket. The protocol indicates whether the high-level socket is in connected mode or unconnected mode. In connected mode, only one group of low-level sockets can be defined for the multiplexing system 110, and the multiplexing system 110 uses the send and recv functions of the low-level socket to send and receive messages. In unconnected mode, multiple groups can be defined for the multiplexing system 110, and the multiplexing system 110 uses the sendto and recvfrom function of the low-level socket to send messages to and receive messages from the socket address for the group.

The type specifies whether the message to be sent will be provided in a single operating system call (referred to as a datagram) or by multiple operating system calls (referred to as a sequence of packets) and buffered by the multiplexing system until the entire message is received. When multiple system calls are used, the last system call indicates the end of the message (e.g., an end of record). Also, only the first of the system calls needs to specify the socket address. After a low-level socket is created, the application invokes the connect function of the low-level socket to establish a connection to a remote device or a listen function to listen for connections. The application then attaches the low-level socket to a high-level socket. The multiplexing system 110 maintains an attach table 320 with an entry 321 mapping a low-level socket to a high-level-socket (e.g., group identifier and socket identifier). The data maintained by the multiplexing system may also be maintained by an object associated with each low-level socket.

The devices on which the multiplexing system 110 may be implemented are computing systems, such as the computing system 1000 of FIG. 10 below, that may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, servers of a data center, massively parallel systems, and so on. The computing systems may access computer-readable media that include computer-readable storage media and data transmission media. The storage media including computer-readable storage media are tangible storage means that do not include a transitory, propagating signal. Examples of computer-readable storage media include memory such as primary memory, cache memory, and secondary memory (e.g., DVD), and other storage. The computer-readable storage media may have recorded on it or may be encoded with computer-executable instructions or logic that implements the multiplexing system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The multiplexing system 110 may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the multiplexing system 110 may be implemented in hardware using, for example, an application-specific integrated circuit (ASIC).

Figure 4:
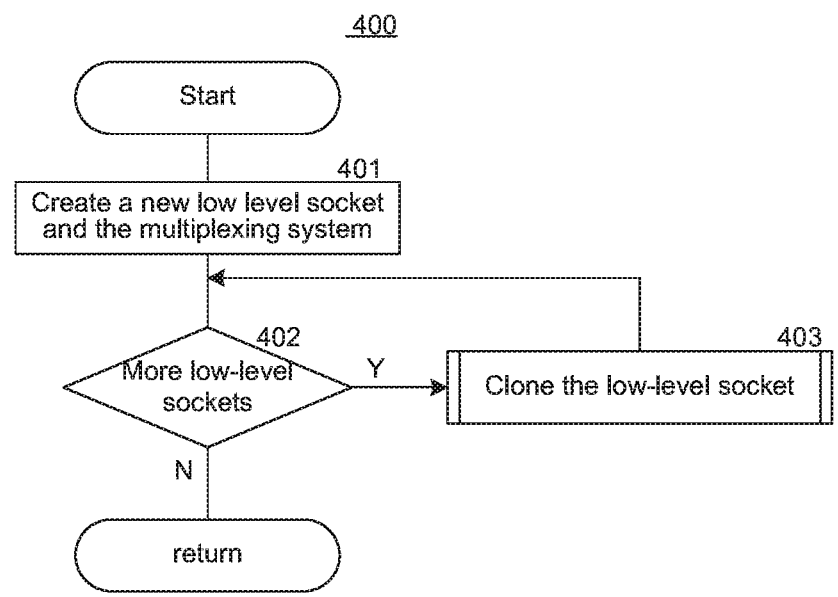
FIG. 4 is a flow diagram a process for generating the multiplexing system of FIG. 1 in some embodiments.

FIG. 4 is a flow diagram for a process of creating the multiplexing system of FIG. 1 in some embodiments. The process 400 can be implemented to generate the multiplexing system 110 of FIG. 1 and/or the multiplexing system 210 of FIG. 2. An application initially creates the low-level sockets and invokes the connect function to establish a connection with a remote device or the listen function to set the low-level socket to the listen mode. The application then configures the multiplexing system 110 to send and/or receive messages using the high-level sockets and the low-level sockets. In block 401, the application creates an initial high-level socket by invoking a socket create function. The application can provide a socket address, a type of the socket, and a protocol of the multiplexing system to be created.

The type of the socket can specify the interface to be implemented by the multiplexing system 110, e.g., a datagram type or a sequence type. In some embodiments, a datagram type socket is configured to send or receive messages atomically, e.g., a single send or receive call can send or receive an entire message. In some embodiments, in a sequence type socket messages may be written using multiple system calls. The message is not sent until the entire message is written to the high-level socket. When a message is sent this way, the segments of the message are buffered in the high-level socket. After the last segment is written, the message can be atomically sent to an appropriate low-level socket.

The protocol of the socket can indicate whether the multiplexing system 110 is to be configured in the connected mode or the unconnected mode. When using sequence type with the unconnected mode of the multiplexing system, only the first send call may have to specify the high-level socket address and this call can temporarily connect the high-level socket to an appropriate group or destination. Subsequent send calls can be called with specify destination.

In some embodiments, when a first high-level socket is generated, the multiplexing system 110 is also generated with the first high-level socket.

At decision block 402, the multiplexing system determines if additional high-level sockets are to be created. In some embodiments, the application can indicate that additional high-level sockets are to be created, e.g., for sending data via multiple threads of the application. If additional high-level sockets have to be created, at block 403, the multiplexing system creates additional sockets by cloning the existing high-level socket, else the process 400 returns.

Figure 5:
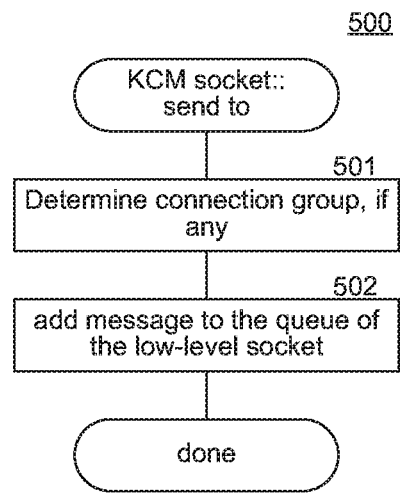
FIG. 5 is a flow diagram of a process for sending data using the multiplexing system in some embodiments.

FIG. 5 is a flow diagram of a process for sending data using the multiplexing system in some embodiments. The process 500 can be implemented in the multiplexing system 110 of FIG. 1 or multiplexing system 210 of FIG. 2. When the application writes a message to the high-level socket to be sent to a destination, the high-level socket can send, e.g., queue, the message to the low-level socket, which can then send the message to the destination. In block 501, the multiplexing system 110 determines the connection group, if any, included with the message.

In block 502, the multiplexing system 110 identifies a low-level socket associated with the connection group and queues the message at the queue of the identified low-level socket. If no connection group is included with the message, the multiplexing system 110 identifies an available low-level socket and then adds the message to the queue of the low-level socket.

Figure 6:
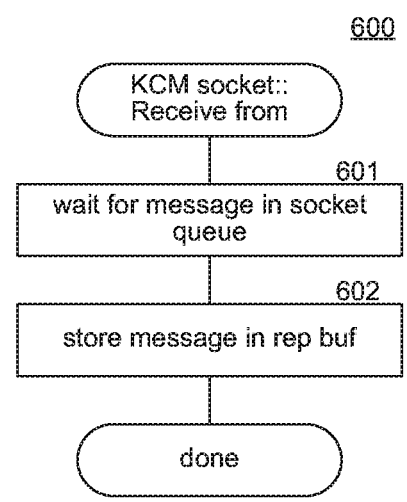
FIG. 6 is a flow diagram of a process for retrieving a message from a high-level socket in some embodiments.

FIG. 6 is a flow diagram of a process for retrieving a message from a high-level socket in some embodiments. The process 600 can be implemented in the multiplexing system 110 of FIG. 1 or multiplexing system 210 of FIG. 2. A receive from component retrieves a message from the queue for the high-level socket and provides that message to the application. In block 601, the component waits for a message to be added to the queue for the high-level socket if one is not already in the queue. In some embodiments, the queue can contain at most one message, while in other embodiments, the queue can contain more than one message. In block 602, the component stores the message in the response buffer of the application and then completes. In some embodiments, the component stores multiple message in the response buffer, which is available to the application as a block of messages or a batch of messages. In some embodiments, the response buffer can be a TCP buffer.

Figure 7:
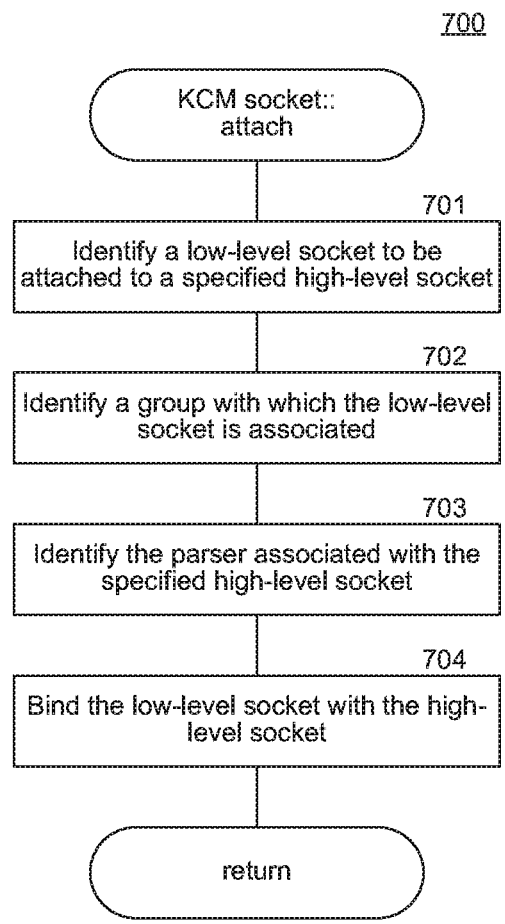
FIG. 7 is a flow diagram of a process of attaching or binding a high-level socket with a low-level socket in some embodiments.

FIG. 7 is a flow diagram of a process of attaching or binding a high-level socket with a low-level socket in some embodiments. The process 700 can be implemented in the multiplexing system 110 of FIG. 1 or multiplexing system 210 of FIG. 2. An attach function assigns a low-level socket to a connection group and then attaches or binds the low-level socket to a high-level socket. In some embodiments, binding a high-level socket and a low-level socket enables the application to send and/or receive data using the attached high-level socket and the low-level socket.

In block 701, the multiplexing system 110 identifies the low-level socket to be bound. In block 702, the multiplexing system 110 identifies the connection group identifier of the low-level socket. In block 703, the multiplexing system 110 identifies the parser associated with a specified high-level socket. In block 704, the multiplexing system 110 binds the low-level socket to the specified high-level socket, e.g., by invoking the ioctl function on the specified high-level socket and passing the information regarding the parser. After the low-level socket is attached to the high-level socket, the multiplexing system 110 updates the attach table 320 to map the low-level socket to the specified high-level socket.

Figure 8:
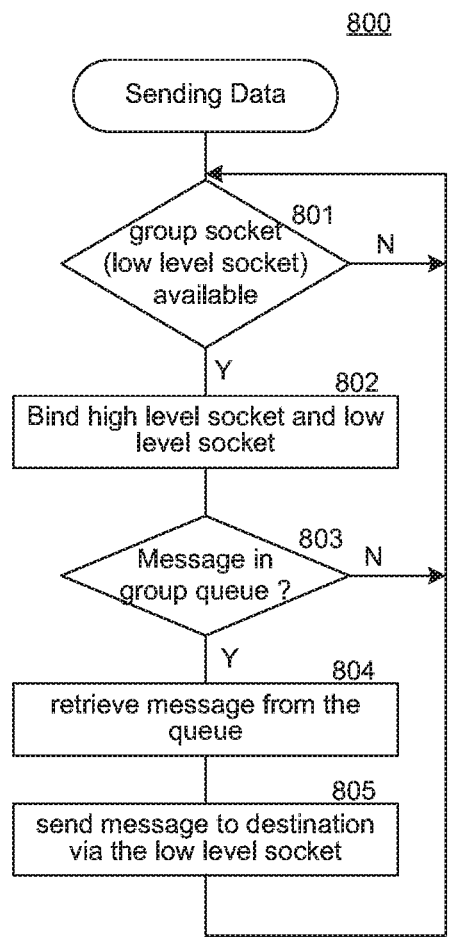
FIG. 8 is a flow diagram that illustrates the processing of sending messages by the multiplexing system in some embodiments.

FIG. 8 is a flow diagram that illustrates the processing of sending messages by the multiplexing system 110 in some embodiments. When the application has to send a message to a group or a destination, the application can obtain a high-level socket from the multiplexing system 110 and store the message at a buffer (send queue) of the high-level socket. A send component 800 is invoked to process messages in the send queue of a connection group. In decision block 801, the send component determines if a low-level socket of the connection group is available. If a low-level socket is available, then the multiplexing system 110 continues at block 802 to bind the low-level socket and the high-level socket. If the low-level socket is not available, the component waits until a low-level socket becomes available.

In decision block 803, the send component determines if there is a message in the queue, e.g., the queue of the high-level socket, for the destination. If there is a message in the queue of the high-level socket, the send component continues at block 804, else the component waits for a message to be placed in the queue. In block 804, the send component retrieves the message from the queue. In some embodiments, if the application prefers to receive a response on the same high-level socket that is used for transmitting a request, the send component can include a transactional identifier in the message being transmitted. In block 805, the send component sends the message to the destination using the available low-level socket and then loops to block 801 to select the next message in the queue. In some embodiments, after all the messages are sent to the destination, the multiplexing system 110 can unbind the high-level socket and the low-level socket, e.g., so that the sockets can be used by other entities, e.g., other threads of the application, for sending and/or receiving messages.

Figure 9:
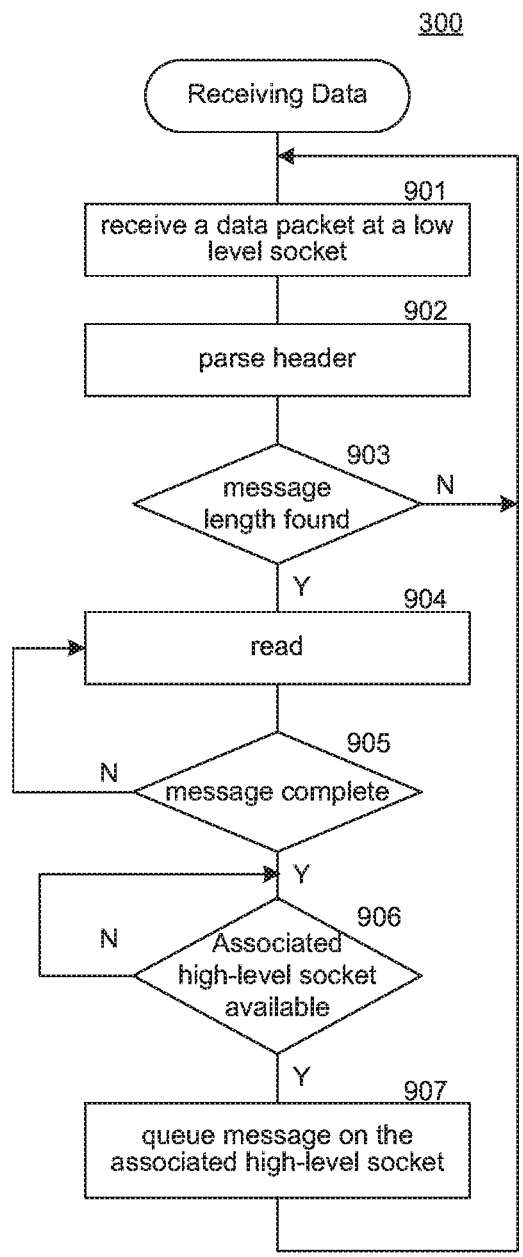
FIG. 9 is a flow diagram that illustrates the processing of receiving a message by the multiplexing system in some embodiments.

FIG. 9 is a flow diagram that illustrates the processing of receiving a message by the multiplexing system 110 in some embodiments. A receive component 900 associated with the multiplexing system 110 is invoked to process a data packet that is being received on a low-level socket for an application. In block 901, the receive component reads the data packet from the low-level socket. In block 902, the receive component uses a parser, e.g., provided by the application, to analyze the data packet for determining the length of a message in the data packet. The receive component uses the parser to extract a transaction identifier associated with the message. The data packet received from the sender can include the transactional identifier. In some embodiments, if the application prefers to receive a response on the same high-level socket as the one used to send a request, the multiplexing system 110 can include a transactional identifier in the request sent to the sender. The multiplexing system 110 can maintain a mapping of the high-level sockets and the transaction identifiers of the messages transmitted by those corresponding high-level sockets. In decision block 903, if the message length has been found, then the receive component continues at block 904, else the component loops to block 901 to read the next data packet. In some embodiments, the multiplexing system 110 can send an error notification to the application and/or the sender indicating its inability to determine the message length. In block 904, the receive component reads the data packet to extract the message of the specified length.

In decision block 905, the receive component determines if an entire message has been received as indicated by the message length. If an entire message has been received, then the receive component continues at block 906, else the receive component loops to block 904 to read the next data packet to obtain the remainder of the message. In some embodiments, the receive component does not send the message to the high-level socket until the entire message is received; the receive component continues to accumulate the bytes from the data packets until an entire message is received.

In decision block 906, the receive component determines if the high-level socket associated with the retrieved transactional identifier is available for accepting new messages. If the high-level socket is available, the receive component proceeds to block 907, else the receive component waits until the high-level socket is available. In block 907, the receive component queues the message on the high-level socket associated with the message identifier and then loops to block 901 to process the next data packet or a remaining portion of the data packet for retrieving a next message. The high-level socket can then send the message to the application.

Figure 10:
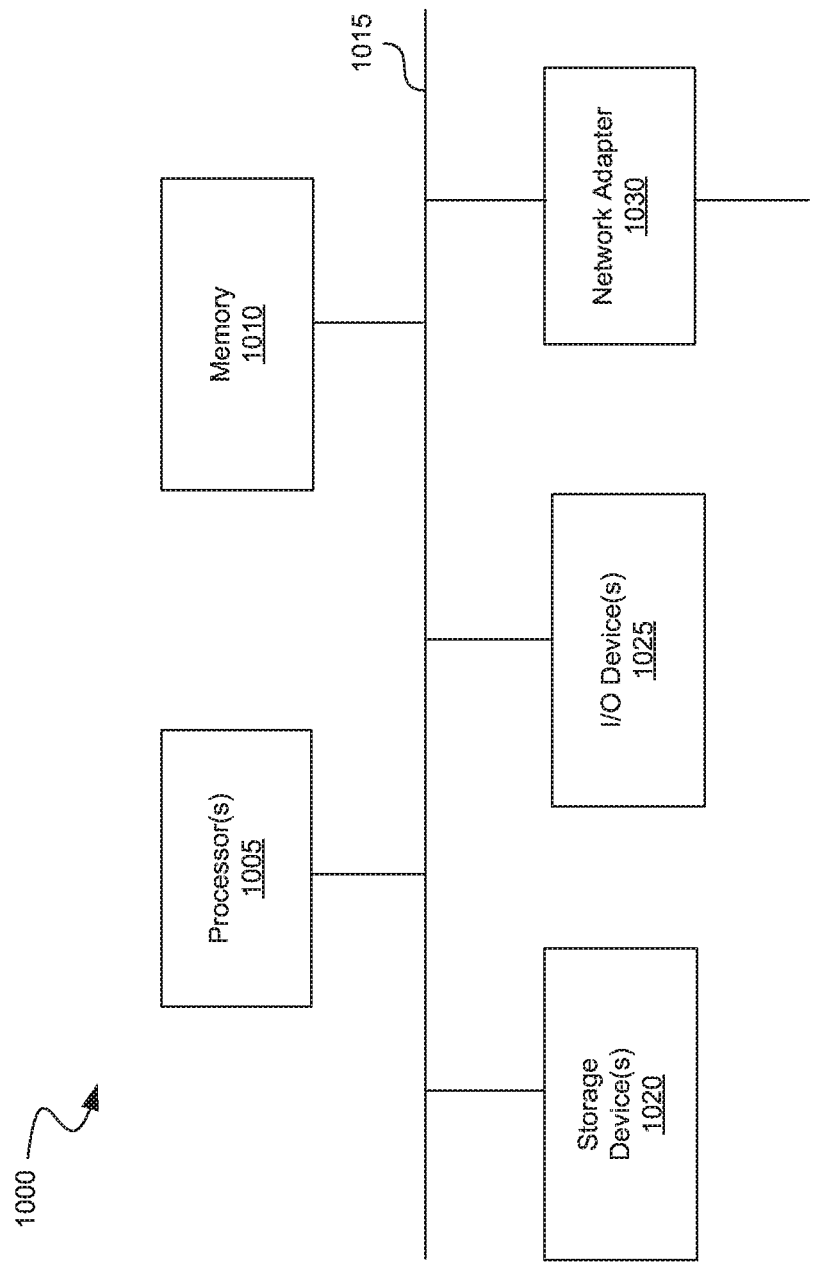
FIG. 10 is a block diagram of a processing system that can implement operations, consistent with various embodiments.

FIG. 10 is a block diagram of a computer system as may be used to implement features of the disclosed embodiments. The computing system 1000 may be used to implement any of the entities, components or services depicted in the examples of the foregoing figures (and any other components and/or modules described in this specification). The computing system 1000 may include one or more central processing units ("processors") 1005, memory 1010, input/output devices 1025 (e.g., keyboard and pointing devices, display devices), storage devices 1020 (e.g., disk drives), and network adapters 1030 (e.g., network interfaces) that are connected to an interconnect 1015. The interconnect 1015 is illustrated as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1010 and storage devices 1020 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 1010 can be implemented as software and/or firmware to program the processor(s) 1005 to carry out actions described above. In some embodiments, such software or firmware may be initially provided to the processing system 1000 by downloading it from a remote system through the computing system 1000 (e.g., via network adapter 1030).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The invention claimed is:

1. A method performed by a device for communicating with a remote device, the method comprising:
    creating at least one stream-based socket to transmit and receive data streams via a transport layer protocol;
    using the transport layer protocol to establish, for the stream-based socket, an open connection between the device and the remote device;
    creating at least one message-based socket to transmit and receive discrete messages via an application layer protocol, the application layer protocol being a higher layer protocol than the transport layer protocol;
    receiving, by a multiplexing system from an application program via the message-based socket, a request to send a discrete message to the remote device;
    determining, by the multiplexing system, whether the open connection of the stream-based socket is being used to send a prior discrete message to the remote device;
    when the open connection of the stream-based socket is not being used, binding the message-based socket to the stream-based socket and sending, by the multiplexing system, the discrete message to the remote device over the open connection via one or more of the data streams; and
    when the open connection of the stream-based socket is being used, queuing, by the multiplexing system, the discrete message for later sending over the open connection.

2. The method of claim 1 further comprising:
    extracting a message identifier from the discrete message; and
    associating the message identifier with the message-based socket so that when a responsive message is received within any additional data stream that includes the message identifier, the responsive message can be identified and provided to the application program via the message-based socket.

3. The method of claim 1 further comprising receiving, from the application program, an indication of a message parser for use in determining the length and the end of an additional discrete message received within the one or more data streams via the stream-based socket.

4. The method of claim 1 further comprising:
    creating multiple additional stream-based sockets to transmit and receive additional data streams via the transport layer protocol;
    establishing, for each of the multiple additional stream-based sockets, an additional open connection between the device and an additional remote device; and
    creating multiple additional message-based sockets to transmit and receive additional discrete messages via the application layer protocol, wherein the application program directs requests to send discrete messages to the remote device via the message-based socket and to the additional remote device via any one of the multiple additional message-based sockets.

5. The method of claim 1, wherein:
the application program employs multiple threads;
the prior discrete message is received from a first thread; and
the discrete message is received from a second thread.

6. A method performed by a device for communicating with a remote device, the method comprising:
creating at least one stream-based socket to transmit and receive data streams via a transport laver protocol;
using the transport laver protocol to establish, for the stream-based socket, an open connection between the device and the remote device;
creating at least one message-based socket to transmit and receive discrete messages via an application laver protocol, the application laver protocol being a higher layer protocol than the transport laver protocol;
receiving from an application program an indication of a message parser for use in determining the length and the end of discrete messages received within the data streams via the stream-based socket; and
when a discrete message is received within a data stream via the stream-based socket:
using the message parser to determine the length and the end of the discrete message;
extracting the discrete message from the data stream; and
after completely receiving the discrete message as indicated by the length of the discrete message, providing the discrete message to the application program via the message-based socket.

7. The method of claim 6 further comprising:
receiving from the application program via the message-based socket a request to send an additional discrete message to the remote device;
when the open connection of the stream-based socket is not being used, binding the message-based socket to the stream-based socket and sending the additional discrete message to the remote device over the open connection via one or more additional data streams; and
when the open connection of the stream-based socket is being used, queuing the additional discrete message for later sending over the open connection.

8. The method of claim 7 further comprising:
extracting a message identifier from the additional discrete message to be sent; and
associating the message identifier with the message-based socket so that when an additional message is received within an additional data stream via the stream-based socket that includes the message identifier, the additional message can be provided to the application program via the message-based socket.

9. The method of claim 7 further comprising:
creating multiple additional stream-based sockets to transmit and receive additional data streams via the transport laver protocol;
establishing, for each of the multiple additional stream-based sockets, an additional open connection between the device and an additional remote device; and
creating multiple additional message-based sockets to transmit and receive additional discrete messages via the application laver protocol, wherein the application program directs requests to send discrete messages to the remote device via the message-based socket and to the additional remote device via any one of the multiple message-based sockets.

10. The method of claim 9, wherein each of the multiple additional stream-based sockets form a group of stream-based sockets for sending discrete messages to the same destination.

11. A method performed by a source device for communicating with destinations, the method comprising:
creating a first group of stream-based sockets to transmit and receive first data streams via a transport laver protocol and a second group of stream-based sockets to transmit and receive second data streams via the transport laver protocol;
using the transport laver protocol to establish, for each stream-based socket in the first group, an open connection between the source device and a first destination;
using the transport laver protocol to establish, for each stream-based socket in the second group, an open connection between the source device and a second destination;
creating at least one message-based socket to transmit and receive discrete messages via an application laver protocol, the application laver protocol being a higher layer protocol than the transport laver protocol;
receiving, by a multiplexing system from an application program via the message-based socket, a request to send a discrete message;
when the discrete message is to be sent to the first destination, selecting an available stream-based socket from the first group and sending, via the selected stream-based socket of the first group, the discrete message to the first destination via one or more of the first data streams; and
when the discrete message is to be sent to the second destination, selecting an available stream-based socket from the second group and sending, via the selected stream-based socket of the second group, the discrete message to the second destination via one or more of the second data streams.

12. The method of claim 11 further comprising providing a responsive message to the discrete message to the application program via the message-based socket.

13. The method of claim 12, wherein the responsive message is received within a data stream via a different stream-based socket of the same group from which the available stream-based socket was selected.

14. The method of claim 13, wherein a message identifier provided in the discrete message is included in the data stream to direct the responsive message to the message-based socket.

15. The method of claim 11, wherein the application program provides a first message parser for determining the length and the end of messages received within data streams from the first destination and a second message parser for determining the length and the end of messages received within data streams from the second destination.

16. The method of claim 11, wherein the first destination and the second destination are different addresses of the same remote device.

17. The method of claim 11 further comprising:
receiving, by the multiplexing system from the application program via the message-based socket, an additional request to send an additional discrete message to the first destination; and
if no stream-based socket in the first group is available, queuing the additional discrete message for later sending when another stream-based socket in the first group becomes available.

* * * * *

UNITED STATES PATENT AND TRADEMARK OFFICE
CERTIFICATE OF CORRECTION

PATENT NO. : 11,032,398 B1
APPLICATION NO. : 16/692504
DATED : June 8, 2021
INVENTOR(S) : Tom Herbert and Blake Ross Matheny Page 1 of 1

It is certified that error appears in the above-identified patent and that said Letters Patent is hereby corrected as shown below:

In the Claims

Claim 1, Column 12, Lines 17-24 should read: receive data streams via a transport layer protocol; using the transport layer protocol to establish, for the stream-based socket, an open connection between the device and the remote device; creating at least one message-based socket to transmit and receive discrete messages via an application layer protocol, the application layer protocol being a higher layer protocol than the transport layer protocol;

Claim 4, Column 12, Line 59 should read: transport layer protocol;
Claim 4, Column 12, Line 65 should read: the application layer protocol, wherein the application Claim 6, Column 13, Lines 11-12 should read: receive data streams via a transport layer protocol; using the transport layer protocol to establish, for the
Claim 6, Column 13, Lines 16-18 should read: receive discrete messages via an application layer protocol, the application layer protocol being a higher layer protocol than the transport layer protocol;

Claim 9, Column 13, Line 57 should read: transport layer protocol;
Claim 9, Column 13, Line 63 should read: the application layer protocol, wherein the application Claim 11, Column 14, Lines 8-12 should read: and receive first data streams via a transport layer protocol and a second group of stream-based sockets to transmit and receive second data streams via the transport layer protocol; using the transport layer protocol to establish, for each
Claim 11, Column 14, Lines 15-22 should read: using the transport layer protocol to establish, for each stream-based socket in the second group, an open connection between the source device and a second destination; creating at least one message-based socket to transmit and receive discrete messages via an application layer protocol, the application layer protocol being a higher layer protocol than the transport layer protocol;

Signed and Sealed this
Third Day of August, 2021

Drew Hirshfeld
*Performing the Functions and Duties of the
Under Secretary of Commerce for Intellectual Property and
Director of the United States Patent and Trademark Office*